United States Patent
Keller (10) Patent No.: US 7,983,891 B1
(45) Date of Patent: Jul. 19, 2011

(54) RECEIVER DEPENDENT SELECTION OF A WORST-CASE TIMING EVENT FOR STATIC TIMING ANALYSIS

(75) Inventor: Igor Keller, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 324 days.

(21) Appl. No.: 10/644,225

(22) Filed: Aug. 19, 2003

(51) Int. Cl.
 *G06F 17/50* (2006.01)
(52) U.S. Cl. .............................. 703/19; 716/6
(58) Field of Classification Search .................... 703/19; 716/6
 See application file for complete search history.

(56) References Cited

U.S. PATENT DOCUMENTS

| | | | | |
|---|---|---|---|---|
| 5,579,510 A * | 11/1996 | Wang et al. | | 716/6 |
| 5,761,097 A * | 6/1998 | Palermo | | 702/79 |
| 6,131,182 A * | 10/2000 | Beakes et al. | | 716/8 |
| 6,430,731 B1 * | 8/2002 | Lee et al. | | 716/6 |
| 6,457,159 B1 * | 9/2002 | Yalcin et al. | | 716/6 |
| 6,598,213 B1 * | 7/2003 | Graef | | 716/6 |
| 6,615,395 B1 * | 9/2003 | Hathaway et al. | | 716/6 |
| 6,782,511 B1 * | 8/2004 | Frank et al. | | 716/1 |
| 6,799,308 B2 * | 9/2004 | You et al. | | 716/6 |
| 6,928,630 B2 * | 8/2005 | Moon et al. | | 716/6 |
| 7,047,508 B2 * | 5/2006 | Chiu | | 716/6 |
| 2003/0131160 A1 * | 7/2003 | Hampel et al. | | 710/22 |
| 2004/0002844 A1 * | 1/2004 | Jess et al. | | 703/14 |
| 2004/0268276 A1 * | 12/2004 | Sheehan | | 716/4 |

OTHER PUBLICATIONS

Lim et al., Accurate Worst Case Timing Analysis Techniques for RISC Processor, IEEE 1994.*
Malik et al., Static Timing Analysis of Embedded Software, 1997.*
L. McMurchie and C. Sechen. WTA—Waveform-Based Timing Analysis for Deep Submicron Circuits. In *Proc. IEEE/ACM International Conference on Computer-Aided Design*, 2002.
N.H.E. Weste and K. Eshraghian, "Principles of CMOS VLSI Design," $2^{nd}$ edition, pp. 442-446, 469-471, 645-653, Addison-Wesley Publishing Company 1993.
J. Qian, S. Pullela, and L.T. Pillage, "Modeling the 'Effective Capacitance' for the RC Interconnect of CMOS Gates," *IEEE Transactions on CAD*, vol. 13, No. 12, pp. 1526-1535, 1994.

* cited by examiner

*Primary Examiner* — Jason Proctor
*Assistant Examiner* — Andre Pierre Louis
(74) *Attorney, Agent, or Firm* — Vista IP Law Group, LLP (57) ABSTRACT

A method for determining a worst-case transition is disclosed. The method includes determining a plurality of output slews for the plurality of input signals based on a timing model of a gate and selecting a worst delay input signal from the plurality of input signals based on the output slews.

41 Claims, 6 Drawing Sheets

RECEIVER DEPENDENT SELECTION OF A WORST-CASE TIMING EVENT FOR STATIC TIMING ANALYSIS

FIELD OF THE INVENTION

The field of the present invention relates to electronic design automation, and more particularly, to methods and systems for timing analysis of electronic circuit blocks.

BACKGROUND OF THE INVENTION

Advances in silicon technology increasingly allow larger and more complex designs of electronic circuits to be formed on a single chip. For example, modern electronic designs have millions or tens of millions of transistors. At the same time, market demands push circuit designers to create these designs rapidly and efficiently. A recent trend to increase the speed and efficiency of the design process involves the re-use, or recycling, of electronic circuit blocks or subsystems, commonly referred to as cores, Intellectual Properties (IPs), or virtual component blocks (VCs). Once the design for a virtual component block has been tested and verified, it can be re-used in other applications that may be completely distinct from the application which led to its original creation.

For example, a subsystem for a cellular phone application specific integrated circuit (ASIC) may contain a micro-controller, a digital signal processor, and other electronic components. After the design for the cellular phone subsystem has been tested and verified, it could be re-used as a virtual component block in a circuit design for an automotive application. The reuse of virtual component blocks allows a designer to complete the design process much faster than building the entire design from scratch, and avoids the need for debugging, testing and verification of the subsystems embodied in the virtual component block.

While virtual components have been found to be convenient for expediting and simplifying the circuit design process, the successful use of virtual component blocks hinges on the ability of the designer to accurately characterize their timing and functionality. A number of techniques have been proposed and developed for performing timing analyses on virtual component blocks, among which static timing analysis (STA) is most widely used.

Static Timing Analysis is used in the process of verifying the timing correctness of a digital circuit design during one clock cycle, without the need for simulating the circuit. During the STA process, a worst-case structural (or topological) delay between a circuit's inputs and outputs is calculated. For example, a model of a signal that propagates through combinational logic includes an analysis of the longest and the shortest paths spanning between a launching register and a capturing register in order to determine, in the worst case, whether the signal arrives at the capturing register during the active pulse of the clock cycle.

In STA, a rising or falling voltage transition is abstracted by a timing event (TE), to approximate the transition of the actual waveform using two of its parameters, the arrival time and slew rate. The arrival time of the transition is based on the time that the voltage of the waveform reached a user-selected reference voltage ($V_{ref}$), or trip point, such as 0.5Vdd for example. The slew rate is determined by an amount of time for the waveform to move from one given voltage level, $V_{th1}$, to a second given voltage, $V_{th2}$. For example, the slew rate may be based on the amount of time that the waveform takes to transition from a voltage of 0.2Vdd to 0.8Vdd. However, given the complexity of modem designs, the approximation of the waveform provided by the TE may be insufficient to verify the design's timing correctness.

For example, in a STA process, a design is represented by an acyclic directed graph, called a Timing Graph (TG), where timing nodes represent intermediate in the design and edges represent delays along nets and library cells. The TG is built using an assumption that the delay through a given stage is dependent only on the waveform that is received by the stage, and on the interconnects of the stage. During the analysis, TEs are propagated forward in the TG from input nodes to output nodes. If a stage has multiple inputs, the corresponding node in the TG receives multiple TEs. A worst-case TE is selected from the multiple TEs at the timing node for further propagation to downstream logic elements during the analysis.

In this conventional approach, only the arrival time of the timing event at the given node is used as the criterion for selecting the worst-case timing event, and the slew rate is typically not considered. However, ignoring the slew rate can lead to optimistic results for the critical path delay that is verified during this process, especially if a skewed gate (a gate with a trip point away from 0.5Vdd) is used. For example, a TE may be selected as the worst-case according to the conventional approach, which is based on the arrival time of the TE on the particular node. However, this "worst-case" TE may not be the worst-case TE if the TEs are propagated to the output of a skewed receiver, because the slew differences of the signals may have a strong impact on the delay over the receiving stage.

To prevent optimistic results, conventional tools [CTEref] allow a user to construct a new timing event by combining the worst arrival time, (such as the maximum time for a max delay analysis or the minimum time for min delay analysis) and the worst slew rate (such as the lowest or highest slew rate for, respectively, max or min delay analysis). The arrival time and slew rate of the new "worst-case" timing event is therefore a combination of various parts of different timing events, rather than a selection of one of the TEs that arrives at the receiving gate. While this approach is usually conservative, it may lead to optimistic results if the receiving gate is skewed. For example, if an inverter is skewed towards a low voltage (e.g. with similar sizes of p- and n-devices), a rising transition with a lower slew rate can result in a lower delay over the inverter.

Furthermore, the conventional analysis does not consider properties of the receiving gate itself when determining the worst-case transition. This causes results based on conventional criteria to be either optimistic or very conservative, and may lead to functional failures or over design.

Therefore, more accurate timing verification methods are needed. [ICCAD ref].

SUMMARY OF THE INVENTION

A method for determining a worst-case timing event is disclosed. The method includes determining a plurality of output arrival times and slew rates for the plurality of input timing events based on the timing model and load of receiving gate, and selecting a worst-case input timing event from the plurality of input timing events based on the arrival times computed on the output of the receiving gate.

DETAILED DESCRIPTION

A method of static timing analysis selects a worst-case timing event, or transition, based on characteristics of the receiving gate, during the design and verification process of an electronic circuit, so that the circuit can be fabricated onto a VLSI chip. Because the receiver-dependent process selects the worst-case timing event at the input of the receiving gate based on the receiving gate's characteristics, such as the gate's delay for example, the receiver-dependent STA results are more accurate than methods that only consider the input timing event's features.

The receiver-dependent STA selects the worst-case timing event from multiple timing events that are sent by one or more driving gates. The selected worst-case timing event is then propagated through the receiving gate to the downstream logic to determine the delays of the circuit design. Calculated delays include the largest and smallest delays along various sensitizable paths that connect sampling blocks (such as flip-flops or latches), or primary inputs and outputs of the circuit, in the direction of the data flow, for example.

Figure 1:
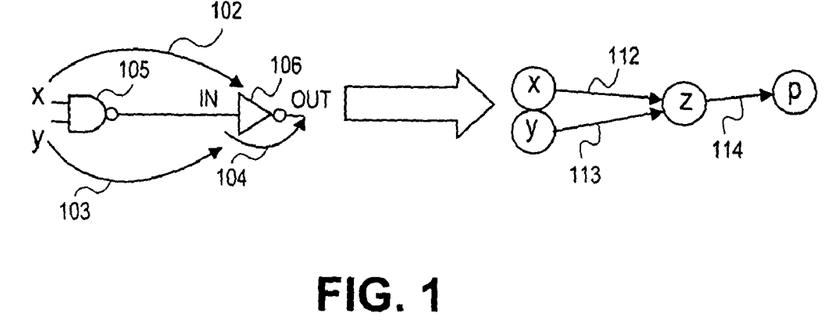
FIG. 1 shows an example of a circuit design partitioned into stages and into a timing graph to perform receiver-dependent static timing analysis.

FIG. 1 shows an example of a circuit design 100 that is partitioned into stages x, y, z, and p to generate the TG 110. The nodes x, y, z, and p of the TG correspond to inputs of the gates where timing events are determined. The timing arcs 102, 103, 104 of the circuit represent sensitizations, or delays, encountered by signals as they propagate through the gates 105 and 106. These sensitizations are represented by the timing events 112, 113, 114 of the TG 110.

During the analysis, the TG 110 is traversed in topological order from the input nodes (sources) x and y to the output node (sink) p corresponding, respectively, to primary inputs and outputs of the circuit 100. The multiple sensitizations (timing arcs) 102, 103 over the NAND gate 105 of circuit 100 leads to multiple timing events 112, 113 that are received by node z of TG 110. The timing event with the worst-case transition is selected to be propagated through the input of inverter 106 at node z and is output by the inverter at node p. This worst-case selection process is based on characteristics of the inverter.

Figure 2:
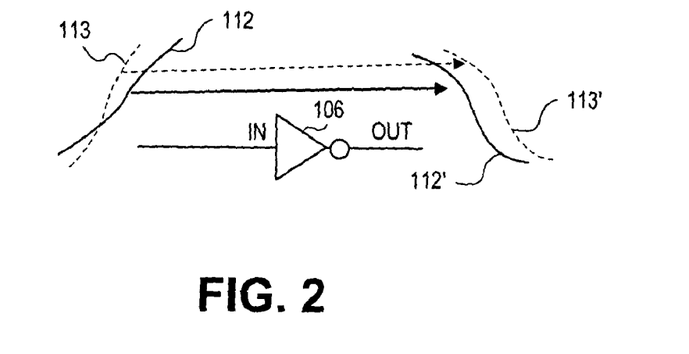
FIG. 2 shows a schematic example of a worst-case transition selection using receiver-dependent static timing analysis.

FIG. 2 shows that the two transitions, 112 and 113, arriving at node z, have different arrival times and clews: the transition with the later arrival time, 112, has a smaller slew than the earlier transition 113. These different slews and arrival times of the transitions arriving at the input of the inverter are used, along with the receiving inverter's characteristics, in selecting the worst-case timing event 113, which is schematically shown in FIG. 2. For example, the selection method can consider the effects of the inverter on the transitions from the arrival times and slews of the transitions 112' and 113' at the receiver's output to identify the worst-case input transition, 113. The receiver dependent selection process is therefore more accurate than a conventional selection method, which chooses the event with the later arrival time at the gate's input, max $\{T_{i,n}\}$.

For example, considering the input transitions as shown in FIG. 2, input transition 112, which has the later arrival time, is chosen as the worst-case transition for further propagation by a conventional method. But when both signals are propagated to the output of the inverter, the transition 112 is not the worst-case, because the inverter's characteristics affect the output times of the transitions 112' and 113' As shown in FIG. 2, the output delay for the signal 113 that travels along x to p is longer than the output delay of the signal 112 that travels along path y to p. Therefore, the signal 112 is selected as having the worst-case transition using the receiver dependent selection method.

The output time, $T_o$, of a transition on the output node OUT may be computed based on the transition's arrival time at the input of the inverter, $T_i$, and the delay over the gate to the output, $D_g$:

$$T_o = T_i + D_g \quad (1)$$

where the times $T_o$ and $T_i$ of the output and input transitions are selected by a user to be the time each reaches its crossing time $V_{ref}$.

The delay $D_g$ of a gate depends in part upon the slew of the input transition; and the capacitive load at the gate's output. The gate delay, $D_g$, can therefore be represented as an algebraic function of the input slew, $S_i$, and the gate's total capacitive load, C [k-factor_ref]):

$$D_g = F(S_i, C) \quad (2)$$

Similarly, the output slew can be represented as a function of input slew and capacitive load:

$$S_o = Q(S_i, C) \quad (3)$$

For N timing events propagated to an input of a receiving gate, $T_{i,n}$, $S_{i,n}$ denote, respectively, arrival times and slews of an n-th timing event at the input of the receiver, for n=1 ... N, where N is number of the timing events. The corresponding output transition is then denoted as $\{T_{o,n}, S_{o,n}\}$. These values are calculated by introducing input slews, $S_{i,n}$, and the total load capacitance C of the net driven by the receiver, into the gate delay model described by equations (2) and (3), such that:

$$D_{g,n} = F(S_{i,n}, C) \quad (4)$$

$$S_{o,n} = Q(S_{i,n}, C) \quad (5)$$

The values of $D_{g,n}$ and $S_{o,n}$ may then be calculated based on given values for $S_{i,n}$ and C. The input slew and total capacitance values may be estimated using a timing model of the receiving gate. However, in many cases, especially for modem processes, wires have non-negligible resistance. Therefore, using the total capacitance as the load C of a gate when calculating the gate delay and the output slew may introduce inaccuracy. In such cases, an effective capacitance may be used in equations (4) and (5) instead of the total capacitance. The effective capacitance, $C_{eff}$, of the load may be determined with an iterative method, and used to more precisely approximate the actual load in terms of output delay [Pileggi]. The iterative method may be performed using an interconnect simplification, and may involve expansive numerical computations. Therefore, if the nets have a large resistance, one can use the iterative method of determining $C_{eff}$, and store the parameters of the simplified net for later use.

In general, using $C_{tot}$ as the receiver load in Eq. (2) can provide the correct ordering of output timing events according to their corresponding arrival times. For example, the delay is usually a monotonic function of output load, and $C_{eff}$ is usually close to the total (lumped) capacitance $C_{tot}$ of the driven net. Therefore, $C_{tot}$ instead of $C_{eff}$ may usually be used in equations (4) and (5) to select the worst-case timing event. This avoids a need in expensive processing of the output net and $C_{eff}$ iterations.

The values $C_{tot}$ and $S_i$ for a given gate, which are used to calculate the output delays and output slews, may be available from a library of timing models, such as LIBERTY [lib_ref] or TLF[tlf_ref]. For example, the library may store a delay model of a gate, including the input slew and capacitive load data of the gate, in a table of a library, as shown in Table 1.

TABLE 1

Delay table for gate as a function of input slew and output load

| $S_i$ | $C_{tot}$ | | | |
|---|---|---|---|---|
| | 10 fF | 30 fF | 100 fF | 300 fF |
| 20 ps | 30 ps | 40 ps | 80 ps | 200 ps |
| 50 ps | 50 ps | 70 ps | 100 ps | 250 ps |
| 200 ps | 80 ps | 120 ps | 180 ps | 350 ps |
| 500 ps | 150 ps | 200 ps | 260 ps | 450 ps |

The columns of Table 1 are headed by capacitive load data, and the rows are headed by input slew data. The data for the capacitive load and input slew values shown in Table 1 may be determined from the results of a number of circuit simulations. For example, the slew of the input transition may be determined by the difference between simulated crossing times of selected threshold voltages, $V_{th1}$ and $V_{th2}$, of the transition. Also, when using the tabular format, an appropriate interpolation between available values may be performed during the analysis.

The delay and slew data may be also fitted using cubic splines having coefficients that are also stored in tables in a library. For example, the coefficients stored in Tables 2 and 3 are used in TLF expressions to determine gate delay and output slew values.

Tables 2 and 3: Examples of spline representation of data in TLF format
Cell(ssad2
...
  TIMING_Model(ioDelayRise Model0
timing_by_trans_and_cap0Mod
  (spline
    data
    (
      (0.202000 0.273000 0.517000 1.496000)
      (0.272000 0.344000 0.641000 1.566000)
      (0.325000 0.396000 0.691000 1.614000)
      (0.415000 0.489000 0.794000 1.717000)
    )
  )
)
Table 3
TLF Load Table
  TIMING_Model(SlopeRiseModel0
timing_by_trans_and_cap_0Mod
  (Spline
    data (
    (0.173000 0.316000 0.983000 3.090000)
    (0.179000 0.324000 0.986000 3.090000)
    (0.189000 0.333000 0.991000 3.092000)
    (0.219000 0.366000 1.020000 3.106000)
  )
)
)

After determining the gate delay and output slew by introducing the input slew and load capacitance values to equations (4) and (5), the arrival times of the transitions at the receiver output are then founded as:

$$T_{o,n} = T_{i,n} + D_n \quad (6)$$

The worst-case timing event selected for the further propagation in the max delay analysis is that having latest arrival time:

$$\max\{T_{o,n}\}, \text{ for } n=1 \ldots N \quad (7)$$

For the min delay analysis one needs to choose a minimum of arrival times instead of maximum.

Figure 3:
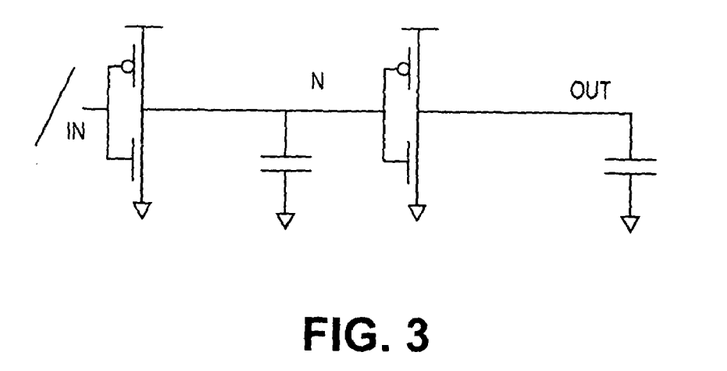
FIG. 3 shows an example of a circuit for which conventional selection criterion leads to optimistic results, and receiver dependent analysis leads to more accurate results.
Figure 4:
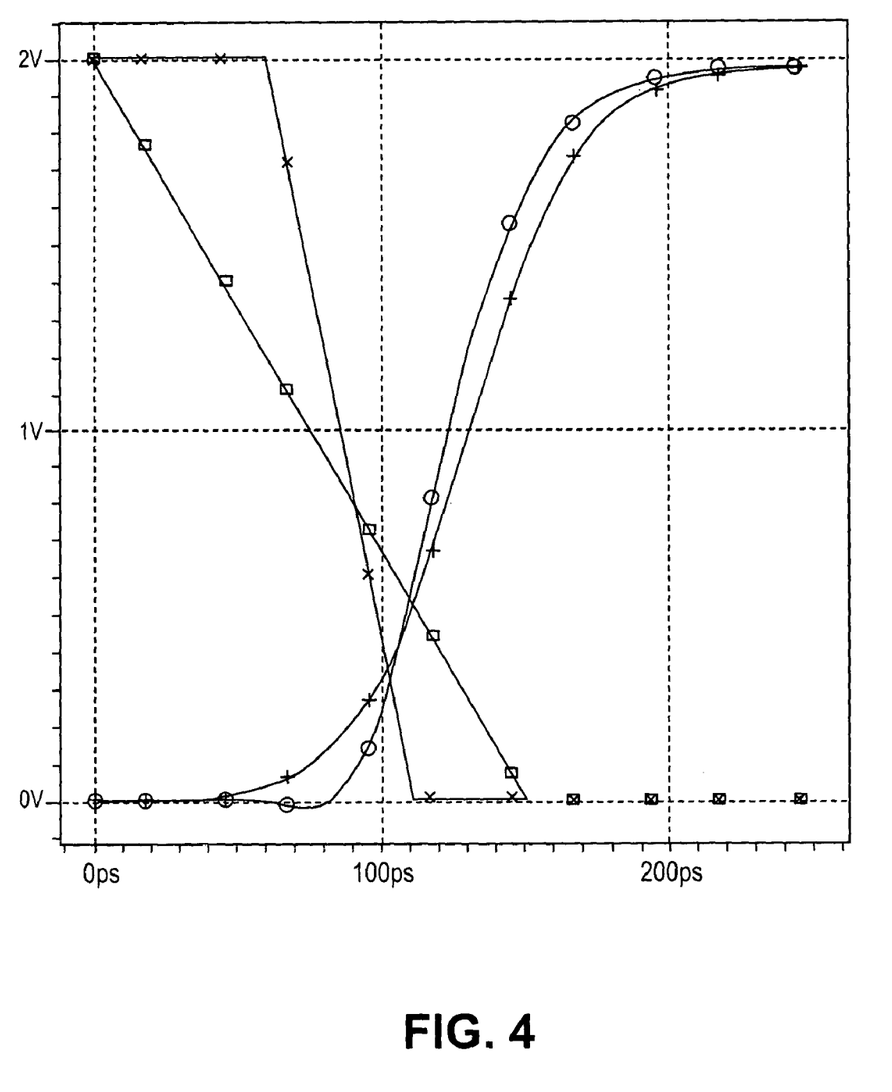
FIG. 4 shows simulation results of transitions applied to the circuit in FIG. 3, including a worst-case transition selected by the receiver dependent method.

To illustrate the receiver dependent selection process, and to quantify the improvement over conventional methods, consider an example of the stage shown in FIG. 3. The driver is an inverter from a 0.13u-technology industrial library skewed towards the low voltage, meaning that n-device is stronger than the p-device. Results of simulations of the circuit for two different transitions at the input are shown in FIG. 4. The two input transitions are linear saturated ramps of 20 ps and 120 ps, respectively, and arrival times differ by 30 ps (as defined by using Vref equal to 50% of Vdd).

The two transitions on the output node N of the skewed inverter have close slews, but as is shown in FIG. 4, the input transition with the worse input slew, which is the linear ramp marked with rectangular boxes, has the output transition with the earlier arrival time, which is the transition curve marked with circles. The transition with the later input arrival time, which is the ramp marked with diagonal crosses, has a better input slew and a later output arrival time, as shown by the curve marked with horizontal and vertical crosses. If a conventional selection criterion is used, then the input with the sharper input slew (the ramp with the diagonal crosses) is chosen as the worst-case transition, and leads to a ~20% underestimation of delay on this stage. If the worse input slew is combined with worse output arrival time to form a new timing event to be propagated further, then a 25% overestimation (conservative) on this stage would occur. The receiver dependent worst-case selection method described is therefore more efficient in selecting the worst-case transition from a plurality of transitions with different arrival times and slews, which in this example is the ramp with the better input slew (the ramp with diagonal crosses).

Practical examples of situations where the receiver dependent method improves the simulation results include converging paths, unbalanced stacks, critical path fixing and optimization, and noise-on-delay effects.

Converging paths. Timing events with different arrival times and slews can emerge due to converging paths. For example, most gates of circuit designs have more that one input. If two or more inputs of a gate receive transitions with very different slews, it is probable that the output transitions will also have different slews. This may cause an inversion of the arrival times of the transitions on subsequent stages, especially if the stages are skewed.

Figure 5:
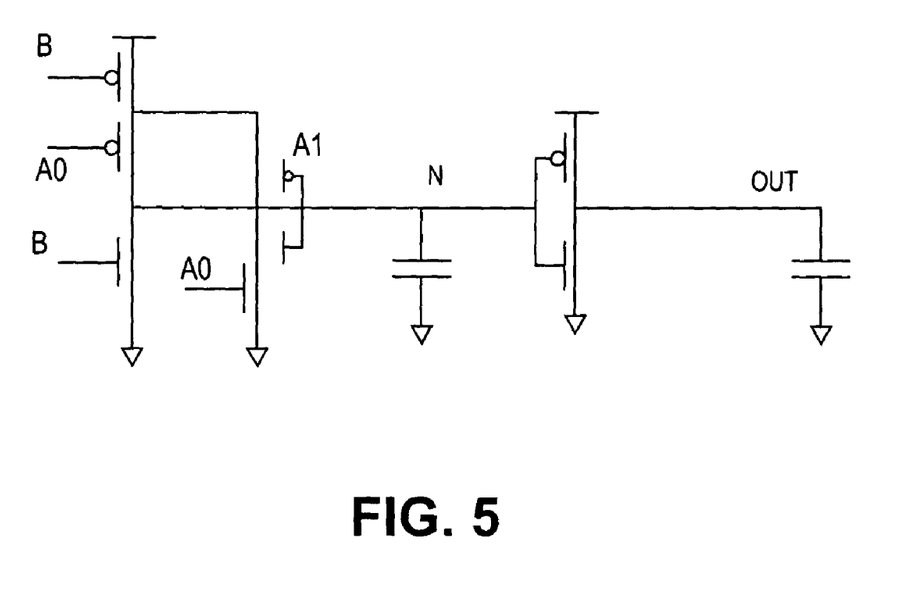
FIG. 5 shows an example of a stage of a complex gate with pull-down stacks having unbalanced strengths, causing different output slew rates which are analyzed by the receiver dependent worst-case selection method.

Unbalanced stacks. Unbalanced strength of device stacks in complex gates can also lead to significant differences in slews of the output transitions. An example of such a circuit is shown in FIG. 5. The circuit has two gates, a driver-complex gate NOT(A0*A1+B), and a receiver-inverter. The complex gate NOT(A0*A1+B) has different strengths of pull-down stacks corresponding to vectors with switching inputs B and A1, respectively. The different strengths of the two vectors cause the two rising transitions B and A1 at the node N to have different output slews at the node OUT, and as a result, the earlier/later arrival times of the transitions are inverted at the receiver's output.

Figure 6:
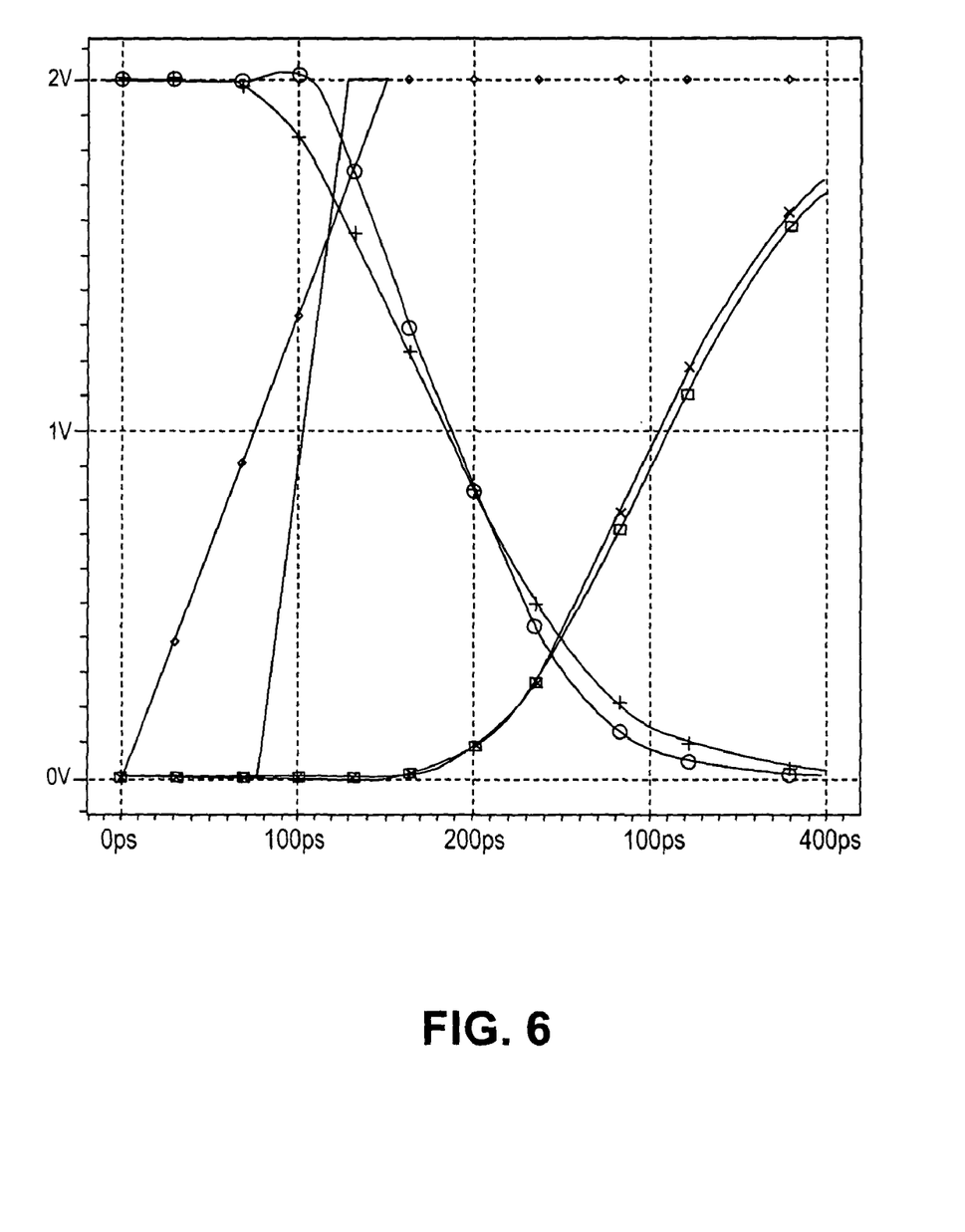
FIG. 6 shows examples of simulation results of transitions applied to the stage shown in FIG. 5.

For example, the simulation results of two transitions on inputs A0 and B of the circuit of FIG. 5 are shown in FIG. 6, by the two saturated ramps. The input transition to A0 is shown in the ramp marked with diamond boxes, and the input transition to B is shown by the ramp having a solid line. The output transitions at the output of the driver have different slews and arrival times: transition B has the faster input slew, but has an output transition that arrives later than the output corresponding to input transition A0, as shown by the output transition for the input to B, which is marked with circles, as compared with the output transition for the input to A0, which is marked with crosses. As a result, the responses on the output of inverter arrive in an order that is the opposite of the order of their input slews. For example, the transitions at the output node OUT, show that the transition caused by the input to node B (the curve marked with rectangular boxes) arrives later than the transition caused by the input to node A0 (the curve marked with diagonal boxes). Therefore, the input signal which arrives earlier on nodes A1 and N has the worst-case transition, and is selected to be propagated on the inverter output, OUT.

Critical path fixing and circuit optimization. During a fixing stage of the design chain, gates belonging to a critical path are often upsized. This affects (mostly improves) both the arrival time and slew of a timing event on the input of the next gate. Although the arrival time is the target of the stage optimization, the improved slew may, depending on the skew property of the receiving gate, have a significant impact on the arrival time on the next stage. The receiver-dependent selection method is therefore more accurate than tools using the conventional worst-case event selection method, because they usually neglect this slew improvement, which may lead to usage of a sub-optimal cell.

Figure 7:
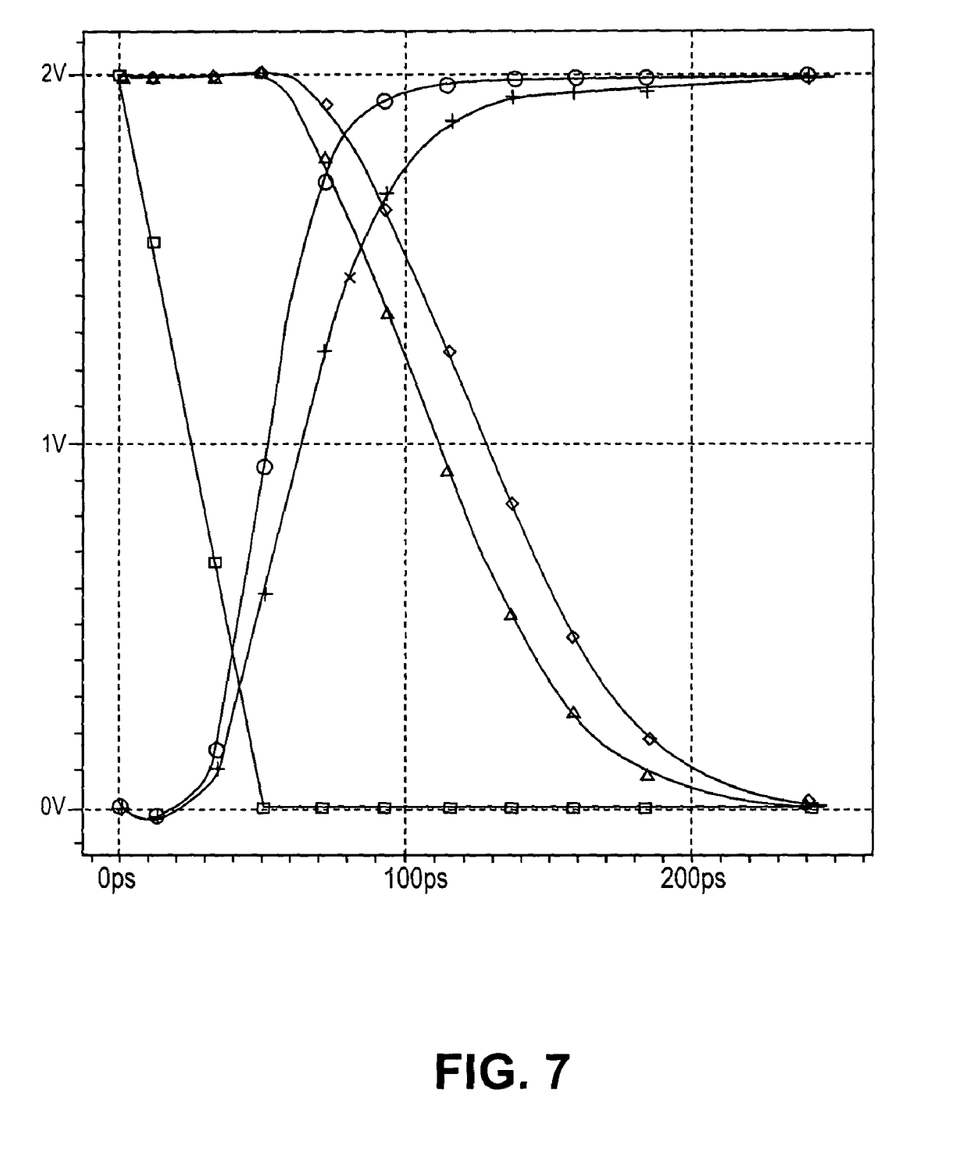
FIG. 7 shows results of circuit simulations of the circuit shown in FIG. 3 having an upsized driver to improve the input slew of the circuit, which is considered during the receiver dependent selection method.

For example, FIG. 7 shows simulation results for two inverters of different sizes, each having the circuit design of FIG. 3. The simulation results are obtained by applying the same input transition to the different drivers, which is represented by the linear saturated ramp of 50 ps, which is marked with rectangular boxes. The original inverter has sizes p/n=1.92u/1.12u. The upsized driver is a stronger inverter having sizes p/n=3.84u/2.52u. The output of the smaller driver to node N is shown by the curve marked with crosses. The output transition of the signal from the smaller driver to node OUT is shown by the curve marked with diamonds. The output of the bigger driver on node N is shown by the curve marked with circles, and the output transition at node OUT is shown by the curve marked with triangles.

As seen in FIG. 7, the delay on the receiver's input improves by ~11 ps when the driver's size is increased. Conventional analysis criterion leads to an over-design of the circuit, because the improved slew on the output of the inverter reduces the delay. The receiver dependent selection process leads to a more efficient design, because the effects of the improved slew rate can be considered based on measurements at the output of receiver. The simulation result of upsizing on the delay that is determined with the receiver dependent selection method therefore becomes significantly more accurate, at ~17 ps.

Figure 8:
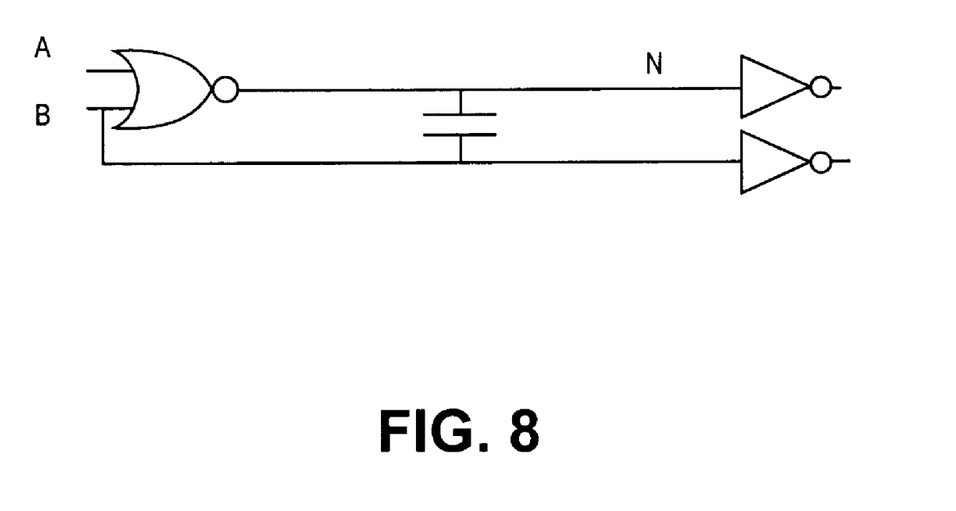
FIG. 8 shows example of a circuit for which logic relations between neighboring nets can lead to different slews and arrival times on the input of receiver if effects of noise-on-delay are considered in the receiver dependent STA.

Noise-on-delay effect. Several tools provide the ability to account for coupling noise effects on delay [CTE/celtic]. The noise effects, such as the logic correlation between victim and aggressor nets, can lead to different stews and arrival times for the transitions at the input and output of the victim net. An example of such a circuit shown in FIG. 8. The aggressor net B causes a push-out and increase of slew of the transition on the victim net N when both are transitioning in opposite directions, such as when the falling transition on N is caused by rising transition on B. However, the net B should not be included in the list of active (switching) aggressors when the falling transition on N is caused by rising transition on A, since this would violate the sensitization. Therefore, in the case of significant coupling between N and B, the difference in slews may be accounted for using the receiver dependent method.

The receiver-dependent static timing analysis provides a method, which indicates how to choose a signal to be propagated to the next gate in the design. The method includes determining an output slews and arrival times for each signal that is input to a gate, based on a timing model of the gate, and selecting a worst delay input signal from the input signals based on the output slews or delays, or both. For example, the signal with the worst output delay as a function of input slew may be selected. Also, the signal with the worst output slew as a function of input slew may be selected. The timing model of the receiving gate is used to find which of the timing events will cause the worst-case arrival time of a signal at a sampling element on the path. The disclosed method therefore provides more accurate and conservative selection criteria for identifying the worst-case timing. It also improves quality of circuit optimization for example helping to minimize over-design of driver upsizing.

The timing analysis method may be performed by an automated process, where a computer readable medium stores a computer program that has instructions for performing receiver-dependent static timing analysis. A computer or processor that receives the computer instructions from the computer memory device then executes the instructions to perform the analysis. In the automated process, the circuit design to be analyzed may include a virtual circuit block with enough information to calculate the output timing delays. The circuit design may, for example, be in a netlist format, with the gates referred to in the netlist being pre-characterized to the extent necessary to perform the timing analysis. Information about timing (i.e., propagation) delays across the gates in the netlist may be stored in a timing library format (TLF) expression or in any other suitable format.

These and other embodiments of the present invention may be realized in accordance with the above teachings and it should be evident that various modifications and changes may be made to the above described embodiments without departing from the broader spirit and scope of the invention. The specification and drawings are, accordingly, to be regarded in an illustrative rather than restrictive sense and the invention measured only in terms of the claims.

I claim:

1. A computer-implemented method for determining a worst-case transition comprising:
   determining a first output timing event at an output of a gate for a first input timing event at an input of the gate based at least in part upon a timing model of the gate;

determining a second output timing event at the output of the gate for a second input timing event at the input of the gate based at least in part upon the timing model of the gate;

selecting, by using a processor, the first input timing event corresponding to the first output timing event as a worst case timing event if the first output timing event has a later arrival time of transitions at the output of the gate than the second output timing event and selecting the second input timing event corresponding to the second output timing event as the worst case timing event if the second output timing event has the later arrival time of the transitions at the output of the gate than the first output timing event such that one of a plurality of timing events propagated to the input of the gate with a worst output slew or output delay as a function of input slew at the output of the gate is selected as the worst case timing event; and storing information related to the worst-case timing event in a non-transitory computer readable medium.

2. The method of claim 1, further comprising:

determining a plurality of gate delays for a plurality of input signals based at least in part upon the timing model of the gate.

3. The method of claim 2, wherein selecting a worst-case input timing event further comprises:

selecting a worst delay based on the gate delays.

4. The method of claim 1, wherein the timing model comprises:

$T_o = T_i + D_g$, $D_g = F(S_i, C)$, $S_o = Q(S_i, C)$;

where $T_o$ is an output time, $T_i$ is an input time, $D_g$ is a gate delay, $S_i$ is an input slew, $C$ is a capacitive load of the gate, and $S_o$ is an output slew, wherein the delay $D_g$ of the gate depends, at least in part, on the slew of the input transition and the capacitive load at the output of the gate.

5. The method of claim 1, wherein the timing model is a timing library format (TLF) model.

6. An apparatus for determining a worst case transition comprising:

a processor programmed for:

determining a first output timing event at an output of a gate for a first input timing event at an input of the gate based at least in part upon a timing model of the gate;

determining a second output timing event at the output of the gate for a second input timing event at the input of the gate based at least in part upon the timing model of the gate;

selecting, by using a processor, the first input timing event corresponding to the first output timing event as a worst case timing event if the first output timing event has a later arrival time of transitions at the output of the gate than the second output timing event and selecting the second input timing event corresponding to the second output timing event as the worst case timing event if the second output timing event has the later arrival time of the transitions at the output of the gate than the first output timing event such that one of a plurality of timing events propagated to the input of the gate with a worst output slew or output delay as a function of input slew at the output of the gate is selected as the worst case timing event; and a non-transitory computer readable medium for storing information related to the worst delay input signal.

7. The apparatus of claim 6, wherein the processor is further programmed for determining a plurality of gate delays for a plurality of input signals based on the timing model of the gate.

8. The apparatus of claim 7, wherein said selecting a worst-case input timing event further comprises:

selecting a worst delay based on the gate delays.

9. The apparatus of claim 6, wherein the timing model comprises:

$T_o = T_i + D_g$, $D_g = F(S_i, C)$, $S_o = Q(S_i, C)$;

where $T_o$ is an output time, $T_i$ is an input time, $D_g$ is a gate delay, $S_i$ is an input slew, $C$ is a capacitive load of the gate, and $S_o$ is an output slew, wherein the delay $D_g$ of the gate depends, at least in part, on the slew of the input transition and the capacitive load at the output of the gate.

10. The apparatus of claim 6, wherein the timing model is a timing library format (TLF) model.

11. A non-transitory computer readable medium storing a computer program comprising instructions which, when executed by a processing system, cause the system to perform a method for determining a worst case transition, the method comprising:

determining a first output timing event at an output of a gate for a first input timing event at an input of the gate based at least in part upon a timing model of the gate;

determining a second output timing event at the output of the gate for a second input timing event at the input of the gate based at least in part upon the timing model of the gate;

selecting, by using a processor, the first input timing event corresponding to the first output timing event as a worst case timing event if the first output timing event has a later arrival time of transitions at the output of the gate than the second output timing event and selecting the second input timing event corresponding to the second output timing event as the worst case timing event if the second output timing event has the later arrival time of the transitions at the output of the gate than the first output timing event such that one of a plurality of timing events propagated to the input of the gate with a worst output slew or output delay as a function of input slew at the output of the gate is selected as the worst case timing event; and storing information related to the worst-case timing event.

12. The medium of claim 11, further comprising instructions, which, when executed by the processing system, cause the system to perform the method for determining a worst case transition, the method further comprising:

determining a plurality of gate delays for a plurality of input signals based at least in part upon the timing model of the gate.

13. The medium of claim 12, further comprising instructions, which, when executed by the processing system, cause the system to perform the method for determining a worst case transition, wherein selecting a worst-case input timing event further comprises:

selecting a worst delay based at least in part upon the gate delays.

14. The medium of claim 11, wherein the timing model comprises:

$$T_o = T_i + D_g,$$

$$D_g = F(S_i, C),$$

$$S_o = Q(S_i, C);$$

where $T_o$ is an output time, $T_i$ is an input time, $D_g$ is a gate delay, $S_i$ is an input slew, $C$ is a capacitive load of the gate, and $S_o$ is an output slew, wherein the delay $D_g$ of the gate depends, at least in part, on the slew of the input transition and the capacitive load at the output of the gate.

15. The medium of claim 11, wherein the timing model is a timing library format (TLF) model.

16. The method of claim 1, wherein the slews of the output timing events include slew rates of the output timing events, which is determined by an amount of time for a waveform to transition from a first voltage level to a second voltage level.

17. The apparatus of claim 6, wherein the output slews of the output timing events include output slew rates of the output timing events, which is determined by an amount of time for a waveform to transition from a first voltage level to a second voltage level.

18. The medium of claim 11, wherein the output slews of the output timing events include slew rates of the output timing events, which is determined by an amount of time for a waveform to transition from a first voltage level to a second voltage level.

19. A computer-implemented method for determining a worst-case timing event comprising:
   determining a plurality of output timing events at an output of a gate for a plurality of input timing events propagated to an input of the gate based at least in part upon a timing model;
   determining one of the plurality of the output timing events at the output of the gate with a latest arrival time of transitions;
   selecting, by using a processor, a first input timing event of the plurality of input timing events corresponding to a first output timing event of the plurality of the output timing events with the latest arrival time of transition as a worst delay input signal if the first output timing event has the latest arrival time of transitions of the plurality of the output timing events and selecting a second input timing event of the plurality of input timing events corresponding to a second output timing event of the plurality of output timing events as the worst case timing event if the second output timing event has the latest arrival time of the transitions of the plurality of the output timing events, wherein the timing model comprises a load data of the gate, an arrival time and a slew rate determined at the output of the gate such that the one of the plurality of input timing events propagated to the input of the gate with a worst output slew or output delay as a function of input slew at the output of the gate is selected as the worst delay input signal; and
   storing information related to the worst-case input timing event in a non-transitory computer readable medium.

20. The method of claim 19, further comprising:
   determining a plurality of gate delays for a plurality of input signals based at least in part upon the timing model of the gate.

21. The method of claim 20, wherein selecting a worst-case input timing event further comprises:
   selecting a worst delay based at least in part upon the gate delays.

22. The method of claim 19, wherein the timing model comprises:

$$T_o = T_i + D_g,$$

$$D_g = F(S_i, C),$$

$$S_o = Q(S_i, C);$$

where $T_o$ is an output time, $T_i$ is an input time, $D_g$ is a gate delay, $S_i$ is an input slew, $C$ is a capacitive load of the gate, and $S_o$ is an output slew, wherein the delay $D_g$ of the gate depends, at least in part, on the slew of the input transition and the capacitive load at the output of the gate.

23. The method of claim 19, wherein the timing model is a timing library format (TLF) model.

24. The method of claim 1, wherein the different arrival times comprise the arrival times of the timing events at each input of the gate.

25. The method of claim 24, wherein the different arrival times of the timing events at each input of the gate comprises the input times of the timing events.

26. The method of claim 1, wherein the different slews comprise transition times of the timing events through the gate.

27. The method of claim 26, wherein the transition times of the timing events through the gate are based at least in part upon characteristics of the gate.

28. The method of claim 26, wherein a duration of the transition times of the timing events through the gate is based at least in part upon characteristics of the gate.

29. A computer-implemented method for determining a worst-case transition comprising:
   identifying a plurality of timing events propagated to an input of a gate having different arrival times at an input of the gate;
   determining different slews from the plurality of the timing events based at least in part upon a timing model of the gate;
   selecting, by using a processor, a first input timing event of the plurality of timing events propagated to the input of the gate which corresponds to a first output timing event as a worst case timing event if a first output timing event has a later arrival time of transitions at an output of the gate than a second output timing event based at least in part upon the timing model and selecting a second input timing event from the one of the plurality of timing events propagated to the input of the gate which corresponds to the second output timing event as the worst case timing event if the second output timing event has the later arrival time of the transitions at the output of the gate than the first output timing event based at least in part upon the timing model, wherein the one of the plurality of timing events propagated to the input of the gate with a worst output slew or output delay as a function of input slew at the output of the gate is selected as the worst case timing event; and
   storing information related to the worst case timing event in a non-transitory computer readable medium.

30. The method of claim 29, wherein the slews comprise transition times of the timing events through the gate.

31. The method of claim 30, wherein the transition times of the timing events through the gate are based at least in part upon characteristics of the gate.

32. The method of claim 30, wherein a duration of the transition times of the timing events through the gate is based at least in part upon characteristics of the gate.

33. A computer-implemented method for determining a worst-case transition comprising:
   identifying a plurality of timing events having different propagation delays;
   determining different arrival times and different slews at an output of a gate of the timing events propagated to an input of the gate based at least in part upon a timing model of the gate;
   selecting, by using a processor, a first input timing event of the plurality of timing events propagated to the input of the gate corresponding to a first output timing event at the output of the gate as a worst case timing event if the first output timing event has a later arrival time of transitions at the output of the gate than a second output timing event at the output of the gate and selecting a second input timing event of the plurality of timing events propagated to the input of the gate corresponding to the second output timing event as the worst case timing event if the second output timing event has the later arrival time of the transitions at the output of the gate than the first output timing event, wherein the timing model comprises a load data of the gate, an arrival time such that the one of the plurality of timing events propagated to the input of the gate with a worst output slew or output delay as a function of input slew at the output of the gate is selected as the worst case timing event; and
   storing information related to the worst-case timing event in a non-transitory computer readable medium.

34. The method of claim 33, wherein the slews comprise transition times of the timing events through the gate.

35. The method of claim 34, wherein the transition times of the timing events through the gate are based at least in part upon characteristics of the gate.

36. The method of claim 34, wherein a duration of the transition times of the timing events through the gate is based at least in part upon characteristics of the gate.

37. The method of claim 1, 19, 29 or 33, wherein information related to the worst-case timing event is stored in a memory device.

38. The apparatus of claim 6, further comprising a means for storing information related to the worst delay input signal.

39. The apparatus of claim 38, wherein the means for storing information related to the worst delay input signal comprises a memory device.

40. The medium of claim 11, wherein information related to the worst delay input signal is stored on a memory device.

41. The method of claim 19, wherein information related to the worst-case input timing event is stored on a memory device.

* * * * *